United States Patent [19]

Miyamoto

[11] 4,378,706
[45] Apr. 5, 1983

[54] RECIPROCALLY DRIVING DEVICE

[75] Inventor: Koichi Miyamoto, Tokyo, Japan

[73] Assignee: Canon Kabushiki Kaisha, Tokyo, Japan

[21] Appl. No.: 186,740

[22] Filed: Sep. 12, 1980

[30] Foreign Application Priority Data

Sep. 17, 1979 [JP] Japan .............................. 54-119050
Oct. 9, 1979 [JP] Japan .............................. 54-130313

[51] Int. Cl.³ .................... F16H 33/02; F16H 29/02
[52] U.S. Cl. .................................. 74/89.22; 74/27;
74/45; 74/79; 74/104
[58] Field of Search ..................... 74/27, 45–48,
74/89.2, 89.21, 89.22, 79, 82, 104, 336 B, 393,
664; 474/74

[56] References Cited

U.S. PATENT DOCUMENTS

| 1,572,918 | 2/1926 | Geodes | 74/45 |
| 1,668,126 | 5/1928 | Robertson | 74/27 |
| 2,552,246 | 5/1951 | Wilckens et al. | 74/393 |
| 2,656,731 | 10/1953 | Wildhaber | 74/393 |
| 3,119,594 | 1/1964 | Heggem | 74/104 |
| 3,208,298 | 9/1965 | Pickles | 74/411 |
| 3,726,148 | 4/1973 | Jope et al. | 74/46 |

FOREIGN PATENT DOCUMENTS

| 1021672 | 12/1957 | Fed. Rep. of Germany | 74/104 |
| 1574718 | 12/1969 | Fed. Rep. of Germany | 74/393 |
| 1076723 | 4/1954 | France | 74/79 |

OTHER PUBLICATIONS

"507 Mechanical Movements", by H. T. Brown, Published by Brown & Seward, 1893, pp. 28-29, 36-37.

Primary Examiner—Lawrence J. Staab
Attorney, Agent, or Firm—Fitzpatrick, Cella, Harper & Scinto

[57] ABSTRACT

A copying apparatus includes device for reciprocally driving an original scanning device having a drive source movable in a predetermined direction, a movement converting device for converting the movement of the drive source into a reciprocal movement in which the time required for backward movement is shorter than the time required for forward movement, output device connected to the movement converting device to put out a reciprocal movement for driving the scanning device, and speed control device for controlling the speed of the forward movement of the movable member so as not to exceed a predetermined speed.

13 Claims, 18 Drawing Figures

RECIPROCALLY DRIVING DEVICE

BACKGROUND OF THE INVENTION

1. Field of the Invention

This invention relates to a device for reciprocally driving a movable member. The present invention is applicable to a device for reciprocally driving original scanning means in a copying machine.

2. Description of the Prior Art

For example, in a copying machine, a movable optical system is reciprocally moved relative to a fixed original carriage to thereby optically scan an original placed on the original carriage and project the image of the original onto a photosensitive medium. Or alternatively, an original is placed on a movable carriage and the movable carriage is reciprocally moved relative to a fixed optical system to thereby optically scan the original. With any of these types of copying machine, it is usual that the original is scanned during the forward movement of original scanning means such as the movable optical system or the movable carriage. In any case, during the scanning of the original, it is desired that the scanned means be moved at a constant speed. After the scanning of the original has been completed, the original scanning means must be moved backward from its forward movement terminal point to its forward movement starting point and in that case, in order to improve the copying efficiency, it is necessary that the time required for the backward movement which is not used for the copying operation be as short as possible, that is, the speed of the backward movement be higher as much as possible than the speed of the forward movement.

The driving devices for the original scanning means as described above include the following types of device;

(a) The type in which a mechanism rotatively movable in both normal and reverse directions and using gears or the like is connected to a drive source rotatively movable in a predetermined direction and the movement thereof is selected by a clutch for normal rotation or a clutch for reverse rotation to drive the original scanning means;

(b) The type in which during the forward movement, the original scanning means is controlled by a clutch and during the backward movement, the original scanning means is driven by either the resilient force of a spring charged during the forward movement or an exclusive motor; and (c) The type in which use is made of a reversible motor exclusively for use for the original scanning and a driven member is driven by the change-over of a switch.

Among these conventional devices, in the one which uses a clutch, the driven member can be driven at a predetermined constant speed substantially simultaneously with the connection of the clutch, but the device of this type has a disadvantage that a great shock occurs to the scanning means when the clutch is connected. Particularly in the case of continuous copying, the speed difference during the reversal of the scanning means from its backward movement to its forward movement is so great that a great deal of shock occurs. Also, the higher the copying speed, the greater the above-described shock. Such shock adversely affects the image formation. In the system of type (a) above, a strong shock also occurs during the reversal of the scanning means from its forward movement to its backward movement.

In the type which uses an exclusive motor, the rising of the motor is slow and therefore, the shock as experienced in the type using a clutch does not occur, but this type of device has disadvantages that the rising of the motor during the forward movement is slow and that the loss of time during the reversal is great and the copying efficiency is low. Also, the system of type (b) above usually uses an AC reversible motor whose number of revolutions is determined by the number of poles and therefore, the obtainable speed of the backward movement is only about twice the speed of the forward movement and moreover, this type of device is costly.

U.S. Pat. No. 3,612,679 discloses a device which uses a cam rotatable in one direction to reciprocally drive scanning means. In this device, if the configuration of the cam is suitably designed, the starting of the forward movement of the scanning means and the reversal of the scanning means from its backward movement to its forward movement can be accomplished without causing the shock of the scanning means. Also, the speed of the backward movement of the scanning means can be made high.

In this system, however, the speed of the scanning means is determined by the configuration of the cam and therefore, to enable the aforementioned optical scanning at a constant speed to be effected, the configuration of the cam must be designed precisely and machined with ultrahigh precision, and this leads to a very high cost of the device.

The above-described situation holds true not only of the device for driving the original scanning means of the copying machine, but also of the usual driving device for reciprocally driving a movable member and moreover, driving such member so that the time required for the backward movement thereof is shorter than the time required for the forward movement thereof.

SUMMARY OF THE INVENTION

It is an object of the present invention to overcome the above-noted various inconveniences.

It is another object of the present invention to provide a reciprocally driving device which can smoothly start a movable member.

It is still another object of the present invention to provide a reciprocally driving device which can smoothly reversely drive a movable member.

It is yet still another object of the present invention to provide a reciprocally driving device which can move a movable member backwardly at a higher speed than the speed of the forward movement thereof and can smoothly change over the movable member between its backward movement and its forward movement.

It is a further object of the present invention to provide a reciprocally driving device in which the loss of time during the starting of the forward movement of the movable member and during the reversal of the movable member is small.

It is a further object of the present invention to provide a reciprocally driving device of simple construction which can achieve the above-described various objects.

Other objects and features of the present invention will become apparent from the following detailed description taken in conjunction with the accompanying drawings.

DESCRIPTION OF THE PREFERRED EMBODIMENTS

Figure 1:
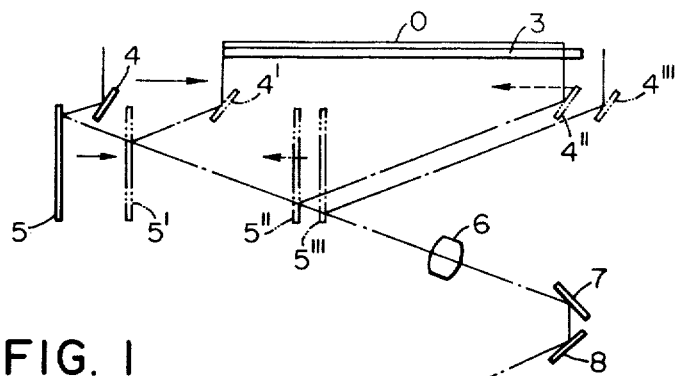
FIG. 1 illustrates an electrophotographic copying machine.

FIG. 1 is a schematic view of a copying machine to which the present invention is applicable. An electrophotographic photosensitive drum 1 is rotated in the direction of arrow. Disposed around the drum 1 in the order of rotation thereof are a charger, an optical slit 2, a developing device, an image transfer device and a cleaning device. The image of an original O is projected upon the photosensitive medium charged by the charger, through the slit 2, whereby an electrostatic image is formed on the photosensitive medium. This electrostatic image is developed into a visible toner image by the developing device. The toner image is transferred to paper by the image transfer device, and the transferred image is fixed while, on the other hand, the photosensitive medium after the image transfer is cleaned by the cleaning device. Such an electrophotographic process is well-known.

The original O rests on a flat transparent original carriage 3 fixed to the frame of the copying machine, and is scanned by a first movable mirror 4 and a second movable mirror 5 during their forward movement. The light from the original O is reflected by the first and second mirrors 4 and 5 in succession and directed to an imaging lens 6, and the imaging light beam emergent from the lens 6 is reflected by fixed mirrors 7 and 8 in succession, whereafter the light beam passes through the slit 2 to the photosensitive medium 1, thus forming the optical image of the original O thereon.

The mirrors 4 and 5 start to move forward in the direction of solid line arrows from their solid line positions (forward movement starting points) and reach their positions 4' and 5', respectively, whereupon they start to scan the original O, and complete the scanning when they have reached their positions 4" and 5", respectively. The mirrors 4 and 5 further move forward to their predetermined forward movement terminal points 4''' and 5''', respectively. From these positions 4''' and 5''', the mirrors 4 and 5 move backward in the direction of broken line arrows and return to their forward movement starting points. The distances from the forward movement starting points 4 and 5 to the original scanning starting positions 4' and 5' are the pre-movement sections of the mirrors 4 and 5, respectively. During their movement in these sections, the mirrors 4 and 5 gain their predetermined velocities for scanning the original. The distances from the position 4" and 5" to the positions 4''' and 5''' are the post movement sections of the mirrors 4 and 5, respectively, and during their movement in these sections, the mirrors 4 and 5 decelerate. The mirrors 4 and 5 move forward in parallelism to the original carriage 3. The velocity of the mirror 4 is twice that of the mirror 5.

Figure 2:
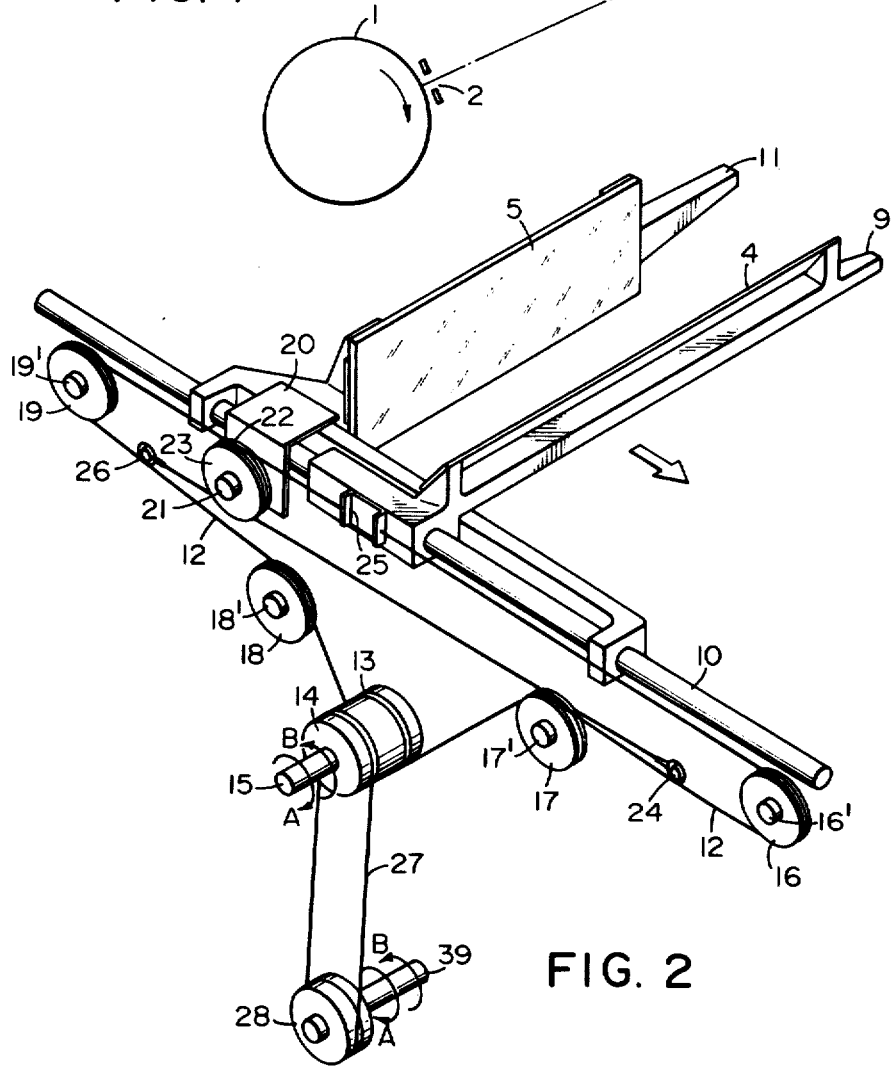
FIG. 2 illustrates original scanning means.

FIG. 2 is a detailed view of the original scanning device used in FIG. 1.

The first movable mirror 4 is fixed to a first movable mirror supporting bed 9 having one end thereof slidably fitted on a straight guide shaft 10. Thus, the mirror 4 moves with the bed 9 along the guide shaft 10. The second movable mirror 5 is fixed to a second movable mirror supporting bed 11 having one end thereof likewise slidably fitted on the guide shaft 10. Thus, the mirror 5 moves with the bed 11 along the guide shaft 10.

Designated by 12 is a wire, and denoted by 13 is a scanning system driving pulley. A pulley 14 is fixed to the pulley 13. The pulleys 13 and 14 are rotatably supported on a shaft 15 provided at a fixed position within the copying machine. Designated by 16', 17', 18' and 19' are shafts provided at fixed positions within the copying machine. Pulleys 16, 17, 18 and 19 are rotatably supported on the shafts 16', 17', 18' and 19', respectively. Denoted by 21 is a shaft fixed to a support plate 20 fixed to the second mirror bed 11. Dynamic pulleys 22 and 23 are supported on the shaft 21 for rotation relative to each other. One end 24 of the wire 12 is secured to a predetermined position within the copying machine. Then, the wire 12 is passed over the pulley 22 and changed in direction, whereafter the wire 12 is secured to the first mirror bed 9 by a fixing member 25 and is then passed over the pulley 16 and changed in direction, and is then passed over the pulley 17 and deflected, and is then wound on the pulley 13 by a turn or a plurality of turns. Then, the wire 12 is passed over the pulley 18 and deflected, and is then passed over the pulley 19 and changed in direction, and is then passed over the pulley 23 and changed in direction, and the end 26 of the wire is secured to a predetermined position within the copying machine.

Designated by 27 is an endless wire. The wire 27 is wound on the pulley 14 and an output pulley 28 to be described, by a turn or a plurality of turns. Thus, when the output pulley 28 is rotated in clockwise direction (direction A), the pulley 14 is rotated in direction A by the drive force transmission of the wire 27 and accordingly, the driving pulley 13 is also rotated with the pulley 14 in direction A to drive the wire 12. Thereby, the mirrors 4 and 5 are moved fowardly from their forward movement starting points (4, 5) of FIG. 1 to their forward movement terminal points 4''', 5''' at a velocity ratio of 1:$\frac{1}{2}$. On the other hand, when the output pulley 28 is rotated in counter-clockwise direction (direction B), the pulley 14 is rotated in direction B by the drive force transmission of the wire 27 and accordingly, the driving pulley 13 is also rotated with the pulley 14 in direction B to drive the wire 12 in the opposite direction. Thereby, the mirrors 4 and 5 are moved backward from their forward movement terminal points 4'' and 5'' of FIG. 1 to their forward movement starting points (4,5) at a velocity ratio of 1:$\frac{1}{2}$.

Figure 3:
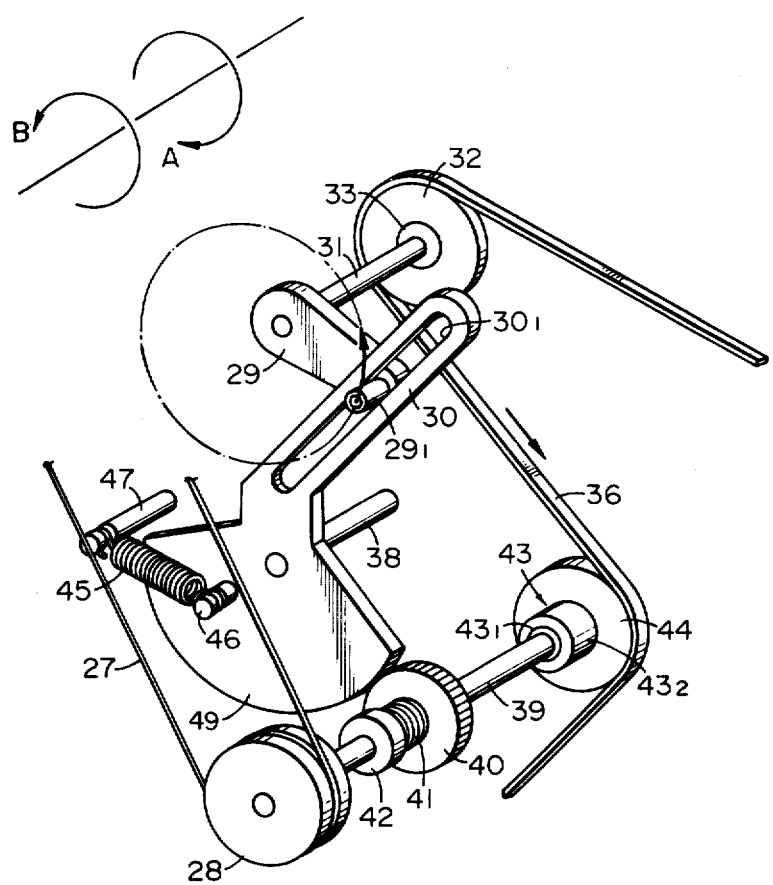
FIG. 3 illustrates an embodiment of the present invention.
Figure 5:
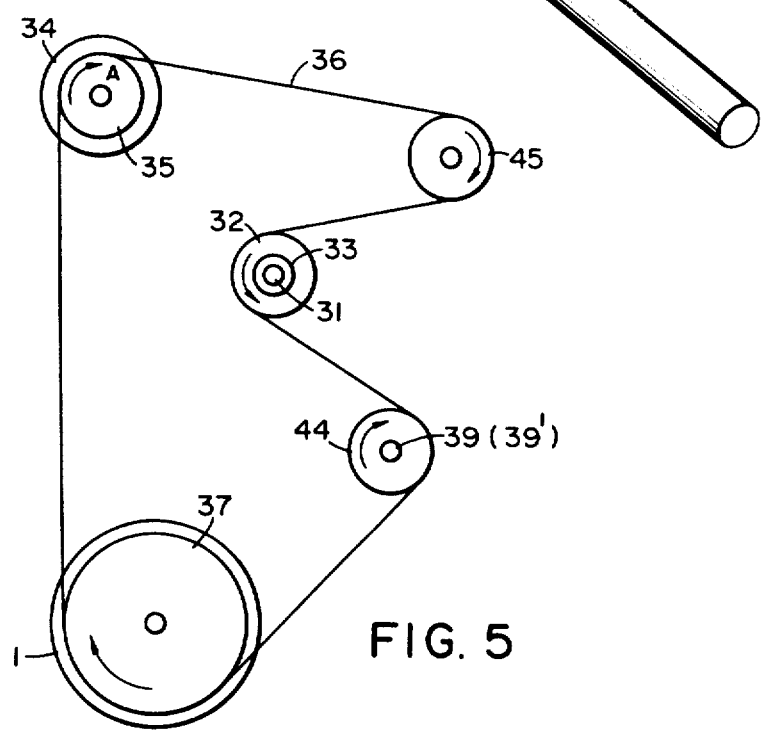
FIG. 5 illustrates the drive force transmitting path in the copying machine.

The reciprocal driving device of FIG. 3 is provided with a quick return mechanism having a crank 29 and a lever 30. The crank 29 is fixed to a shaft 31. An electromagnetic clutch 33 is mounted on the shaft 31 and a sprocket 32 is fixed to the clutch 33. When the clutch 33 is energized, the pulley 32 becomes fixed relative to the shaft 31, and when the clutch 33 is deenergized, the pulley 32 becomes free to rotate relative to the shaft 31. As shown in FIG. 5, a chain 36 passed over a sprocket 35 fixed to the output shaft of a motor 34 is passed over the sprocket 32. The motor 34 is rotatable at a constant speed only in direction A. (In FIG. 5, reference numeral 45 designates an idler sprocket.) When the operator sets a desired number of copies m by a copy number setting device (not shown) provided on the operating panel of the copying machine and closes a copy instructing switch (not shown), the motor 34 starts to rotate in the direction of arrow A, whereby the photosensitive drum 1 starts to rotate. (A sprocket 37 is fixed to the drum 1 and a chain 36 is passed over the sprocket 37). When the drum 1 has made a predetermined number of rotations and the image formation preparation step such as adjusting the sensitivity of the photosensitive medium to a predetermined level has been terminated, the aforementioned clutch 33 is energized. Thereupon, the shaft 31 starts to rotate in direction B and accordingly, the crank 29 also starts to rotate in direction B. Thereby, the first mirror 4 and the second mirror 5 start their said forward movement. When the mth reciprocal movement of the mirrors 4, 5 is terminated, the clutch 33 is deenergized and the crank 29 stops rotating. The motor 34 continues to rotate for a predetermined time even after the deenergization of the clutch 33 and at this time, the transfer of the toner image to the mth sheet of transfer paper and further, the post-treatment step such as the cleaning of the photosensitive medium is fulfilled. As is apparent from what has been described above, the crank 29 continues to rotate at a constant speed from after the clutch 33 has been energized until it is deenergized.

The lever 30 is pivotally supported on a shaft 38. A roller $29_1$ provided at the end of the crank 29 is fitted in a slot $30_1$ formed lengthwise of the lever 30. Thus, when the crank 29 makes one full rotation in direction B, the lever 30, makes one reciprocal pivotal movement about the shaft 38. That is, the lever 30 forwardly pivots in direction B and backwardly pivots in direction A. The angle of rotation of the crank 29 required to cause the lever 30 to pivot in direction B is greater than that required to cause the lever 30 to pivot in direction A and the crank 29 is rotating at a constant speed and therefore, the backward movement time of the lever 30 is shorter than the forward movement time of the lever 30.

A half-moon gear 49 is provided at one end of the lever 30. This half-moon gear 49 is in mesh engagement with a gear 40 fitted on a shaft 39. Accordingly, when the lever 30 pivots in direction B, the half-moon gear 49 also pivots in direction B, whereby the gear 40 rotates in direction A. Conversely, when the lever 30 pivots in direction A, the half-moon gear 49 also pivots in direction A, whereby the gear 40 rotates in direction B. The radius of the gear 40 is smaller than the radius of the gear 49.

Figure 4:
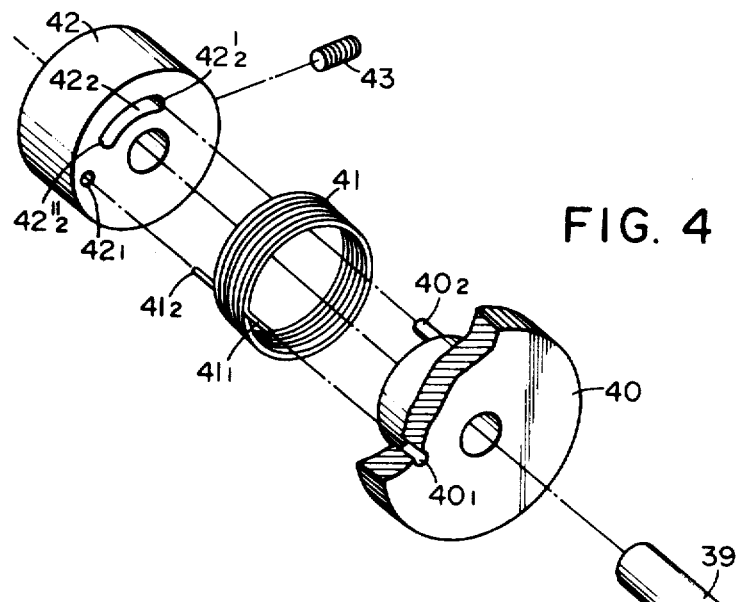
FIG. 4 illustrates speed difference absorbing means.

As shown in FIG. 4, the gear 40 is rotatably supported on the shaft 39. The bent portion $41_1$ of one end of a coil spring 41 is inserted in the hole $40_1$ of the gear 40. The bent portion $41_2$ of the other end of the coil spring 41 is inserted in the hole $42_1$ of a sleeve 42 provided on the shaft 39 in opposed relationship with the gear 40. A pin $40_2$ secured to the gear 40 is adapted to fit in the slot $42_2$ of the sleeve 42, and the gear 40 and the sleeve 42 are rotatable relative to each other within the range between the lengthwise opposite ends $42_2'$ and $42_2''$ of the slot $42_2$. The pin $40_2$ is inserted in the slot $42_2$ with the coil spring 41 tightened to some degree. Accordingly, with a load capability of further tightening the spring 41 being not applied to the gear 40, the pin $40_2$ bears against one end $42_2'$ of the slot $42_2$. The sleeve 42 is secured to the shaft 39 by means of a set screw 43.

Turning back to FIG. 3, the aforementioned output pulley 28 is fixed to one end of the shaft 39. The inner race $43_1$ of a well-known overrunning clutch (one-way clutch) 43 is fixed to the other end of the shaft 39. A sprocket 44 is fixed to the outer race $43_2$ of the overrunning clutch 43. The aforementioned chain 36 is passed over the sprocket 44. As previously described, when the motor 34 runs, the sprocket 44 is rotated only in direction A at a constant speed. Thus, the overrunning clutch 43 fixedly couples the shaft 39 to the pulley 14 when the shaft 39 tries to rotate in the same direction as the pulley 44 but at an angular speed higher than that of the pulley 44. However, where the angular speed of the shaft 39 in said direction is lower than that of the pulley 44 and where the shaft 39 rotates in the direction opposite to the pulley 44, the clutch 43 is not operated. Accordingly, in this case, the shaft 39 rotates relative to the pulley 44.

Operation of the present mechanism will now be described.

When the crank 29 starts to rotate from its shown position in direction B, the lever 30 starts to pivot in direction B and the speed thereof increases smoothly. This movement is transmitted to gear 40, from which it is transmitted to the shaft 39 through the coil spring 41. When the speed of the pivotal movement of the lever 30 in direction B is further increased, the speed of the rotation of the gear 40 in direction A comes to exceed the speed of the rotation of the sprocket 44 in direction A. Thereupon, the overrunning clutch 43 engages and the shaft 39 is fixedly coupled to the sprocket 44 and therefore, the rotational speed of the shaft 39 becomes coincident with the rotational speed of the sprocket 44 and a further increase in the rotational speed becomes impossible. This is because the sprocket 44 is being rotatively driven at a constant speed by the motor 34 through the chain 36. If the speed of the shaft 39 and accordingly, the speed of the sprocket 44 tries to become higher than the aforementioned speed, a load is exerted on the chain 36 and this load acts as a brake force on the sprocket 44 and accordingly, on the shaft 39, thus restraining the shaft 39 from accelerating above said speed. Accordingly, once the overrunning clutch 43 has fixedly coupled the shaft 39 to the sprocket 44, the shaft 43 rotates at a constant angular speed equal to that of the sprocket 44. When the rotational speed of the gear 49 further increases, the gear 40 is rotatively displaced relative to the shaft 39 in direction A while resiliently deforming the coil spring 41 in a direction to tighten the coil spring. Further, when the crank 29 continues to rotate, the rotational speed of the lever 30 in direction B is decreased, but the shaft 39 continues to rotate at a speed equal to that of the sprocket 44 as long as said resilient deformation of the coil spring 41 remains. When the crank 29 continues to rotate and the lever 30 reaches the end of its pivotal movement in direction B and changes to its pivotal movement in direction A, the gear 40 changes to its rotation in direction B and the pin $40_2$ pushes the end $42_2'$ of the slot $42_2$ of the sleeve 42 to rotate the shaft 39 in direction B at an angular speed equal to that of the gear 40. At this time, the overrunning clutch 43 is disengaged and the shaft 39 is released from the sprocket 44. The lever 30 smoothly accelerates in direction A and reaches its maximum speed, whereafter it smoothly decelerates and returns to the end of its pivotal movement in direction A (the starting point of its pivotal movement in direction B). The change in the speed of the rotation of the gear 40 in direction B corresponds to the change in the speed of the pivotal movement of the lever in said direction A. Also, the change in the speed of the rotation of the shaft 39 in direction B corresponds to that of the gear 40.

Since the output pulley 28 is fixed to the shaft 39, it is rotated in the same direction and at the same angular speed as the shaft 39. As is apparent from what has been described above, the first and second scanning mirrors 4 and 5 are reciprocally moved correspondingly to the rotation of the pulley 28. Accordingly, the first and second scanning mirrors 4 and 5 smoothly start from their respective forward movement starting points, and the rising of their forward movement speeds after the starting is quick. Also, the mirrors 4 and 5 move backward toward their respective forward movement starting points and return to such starting points while smoothly decelerating.

Where the number of copies is set to m, the above-described operation is repeated m times. The reversal of the shaft 39 and accordingly, of the mirrors 4, 5 from the backward movement to the forward movement is effected smoothly.

Figure 6:
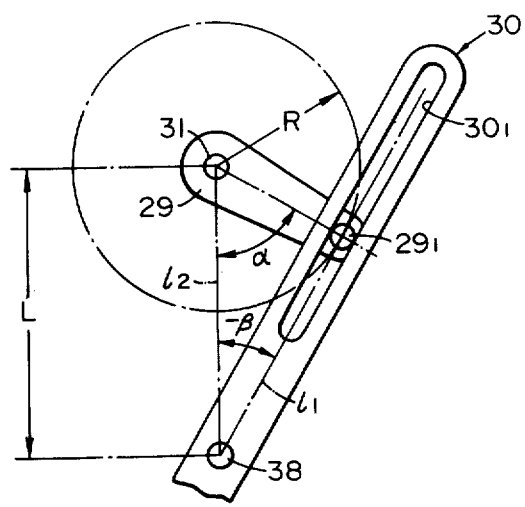
FIG. 6 illustrates a crank-lever mechanism.

FIG. 6 shows an example of the crank lever mechanism which is applicable to the present invention. The lever 30 has a straight slot $30_1$ therein, and a roller $29_1$ provided on the crank 29 slides along the slot $30_1$. In the example shown, the lengthwise center line $l_1$ of the slot $30_1$ passes through the pivot axis 38 of the lever 30. Here, let R be the rotational radius of the crank 30 (the distance between the shaft 29 and the roller $29_1$), and L be the distance between the shaft 31 and the shaft 38. Then, L = nR. Assume that the crank 30 rotates in counter-clockwise direction (direction B) and that the angle of rotation $\alpha$ of the crank 30 is a value measured in the rotational direction of the crank from a line $l_2$ passing through the shaft 31 and the shaft 38. Also assume that the angle of rotation $\beta$ of the lever is a value measured in counter-clockwise direction from the same line $l_2$.

Figure 7:
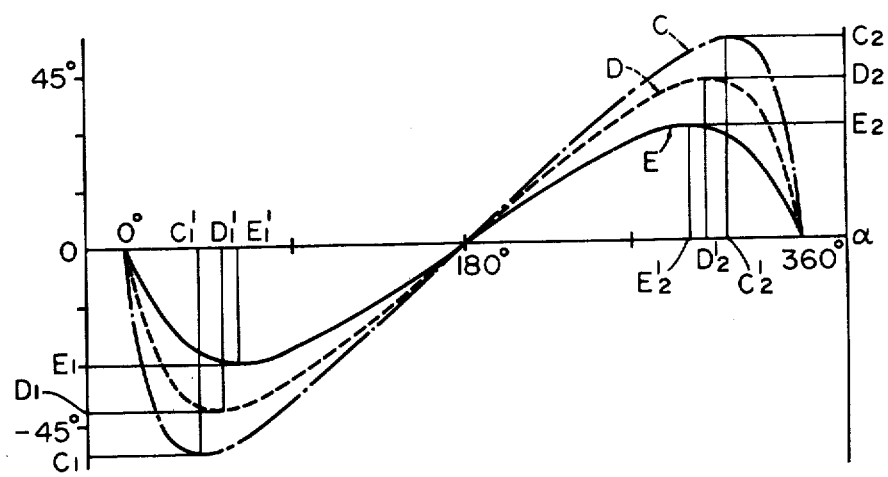
FIG. 7 illustrates the movement of the FIG. 6 mechanism.

FIG. 7 shows the relation between the angles $\alpha$ and $\beta$ in this mechanism with the value of n as a parameter. Curve C refers to the case where n = 1.25, curve D refers to the case where n = 1.5, and curve E refers to the case where n = 2. In any of these cases, it is seen that the lever 29 smoothly starts and smoothly reverts. As n is smaller, the speeds of the forward and the backward movement are greater and the acceleration and deceleration rates during the starting and the reversal are greater. On the other hand, if n is smaller, the range of angle of pivotal movement of the lever 29 is increased. In the designing of an actual apparatus, n may be suitably determined by taking such factors as the copying speed, the size of the apparatus, etc. into account.

When n = 1.25, the forward movement starting point of the lever 30 is the position of an angle $C_1$ as measured from said line $l_2$, and the forward movement terminal point of the lever 30 is the position of an angle $C_2$ as measured from said line $l_2$. When the crank 29 starts to rotate in direction B from the angle position $C_1'$ corresponding to said angle $C_1$, the lever 29 starts to rotate in direction B. At this time, the angle between the lines $l_1$ and $l_2$ changes on the curve C in FIG. 7 so that it passes from coordinates ($C_1'$, $C_1$) through coordinates (180°, 0°) to coordinates ($C_2'$, $C_2$). When the crank 29 reaches the angle position $C_2'$, the lever 30 reverts to start rotating in direction A. At this time, the angle between the lines $l_1$ and $l_2$ changes on the curve C in FIG. 7 so that it returns from coordinates ($C_2'$, $C_2$) through coordinates (360°, 0°) (this is the same as coordinates (0°, 0°)) to coordinates ($C_1'$, $C_1$).

Likewise, when n = 1.5, the forward movement starting point of the lever 30 is the angle position $D_1$ and the forward movement terminal point of the lever 30 is the angle position $D_2$; when n = 2, the forward movement starting point of the lever 30 is the angle position $E_1$ and the forward movement terminal point of the lever 30 is the angle position $E_2$. In both of the case where n = 1.5 and the case where n = 2, the angle between the lines $l_1$ and $l_2$ likewise changes along the curves D and E in accordance with the rotation of the crank 29.

Figure 8:
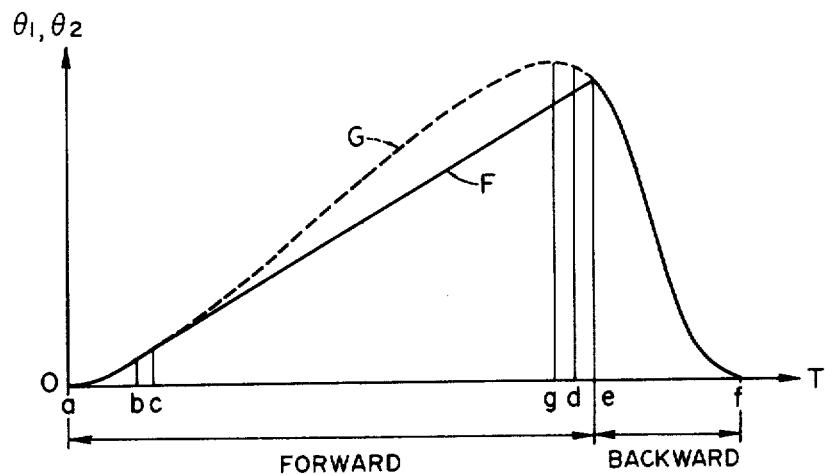
FIG. 8 illustrates the movement of a device using the mechanism of FIG. 6.

FIG. 8 shows the relations between T and $\theta_1$, $\theta_2$, where T represents the time from the point of time whereat the gear 40 has started in direction B (the point of time whereat the gear 40 has started in direction A), and $\theta_1$ and $\theta_2$ respectively represent the angles of rotation of the gear 40 and shaft 39 with respect to the time T. Line G represents the angle of rotation of the gear 49, and line F represents the angle of rotation of the shaft 39. The line G overlaps with the line F between a and b and between e and f. The line G differentiated by time T is the angular speed of the gear 40, and the line F differentiated by time T is the angular speed of the shaft 39.

In FIG. 8, the crank 29 starts at point a. That is, at point a, the mirrors 4 and 5 start from their respective forward movement starting points. At point b, the overrunning clutch 43 engages and the shaft 39 is fixedly coupled to the sprocket 44. That is, from point b, the mirrors 4 and 5 move forward at constant speeds. At point c, the original starts to be scanned. That is, at point c, the mirrors 4 and 5 arrive at the positions 4' and 5' of FIG. 1, at point d, the scanning of the original is terminated. That is, at point d, the mirrors 4 and 5 arrive at the positions 4" and 5" of FIG. 1. At point e, the overrunning clutch 43 is disengaged. That is, the shaft 39 is released from the sprocket 44. In FIG. 8, at said point e, the mirrors 4 and 5 start their backward movement. That is, at point e, the mirrors 4 and 5 arrive at their respective forward movement terminal points (the positions 4''' and 5''' of FIG. 1). At point f, the crank 29 terminates 360° of rotation and the mirrors 4 and 5 return to their respective forward movement starting points.

Generally speaking, it is desirable that the point b whereat the overrunning clutch 43 engages lie between point a and point c. Alternatively, point b and point c may be coincident with each other. Also, it is desirable that the point e whereat the overrunning clutch 43 is disengaged lie after point d. Alternatively, point e and point d may be coincident with each other. Also, point e lies at or before the point of time whereat the mirrors 4 and 5 arrive at the positions 4''' and 5'''.

Turning back to FIG. 8, it is seen that the mirrors 4 and 5 smoothly start and smoothly revert from the backward movement to the forward movement. Incidentally, at point g which is the highest point of time of curve G, the gear 40 terminates its rotation in direction A. In other words, the gear 40 reverses its direction of movement from the forward movement direction to the backward movement direction at point g. Accordingly, the narrower the interval between point g and point e, the smaller the shock of the shaft 39 during its reversal from the forward movement direction to the backward movement direction. That is, the shock of the mirrors 4, 5 during their reversal from the forward movement to the backward movement becomes smaller. To realize this, the inclination of the straight line F between points b and c with respect to the horizontal axis may be made greater than in FIG. 8. In other words, the original scanning speed may be set to a higher value. By this, point e can be brought closer to point g. Another method is to bring point g closer to point e. An example of the means for realizing this latter method will be described with reference to FIG. 9.

Figure 9:
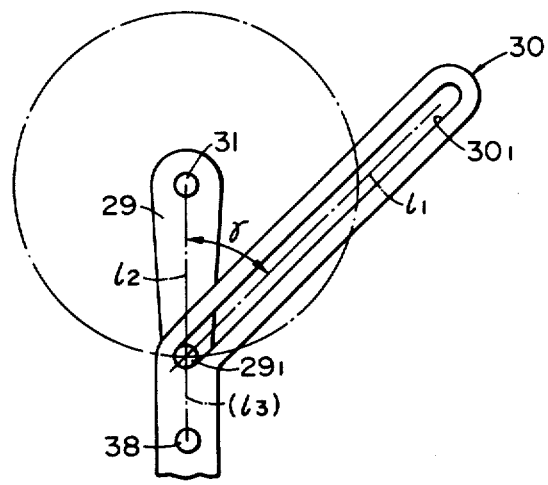
FIG. 9 illustrates another example of the crank-lever mechanism.
Figure 10:
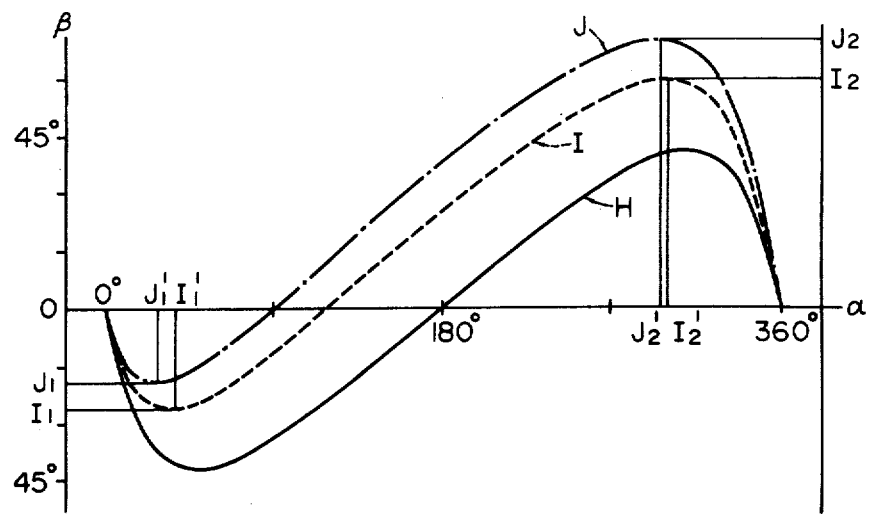
FIG. 10 illustrates the movement of the FIG. 9 mechanism.

In FIG. 9, the center line $l_1$ of the slot $30_1$ of the lever 30 does not pass through the axis 38. In a condition wherein the roller $29_1$ of the crank is positioned on straight line $l_2$, said center line $l_1$ intersects the line $l_2$ between the axes 31 and 38. FIG. 10 shows the relation between $\alpha$ and $\beta$ in a case where n=1.5 in such device of FIG. 9. In this case, $\beta$ is the angle formed by a straight line $l_3$ supposed on the lever 30 with said straight line $l_2$. Said straight line $l_3$ is coincident with the straight line $l_2$ when the roller $29_1$ of the crank is positioned at the dead point of FIG. 9.

In FIG. 9 curve I is the $\alpha$-$\beta$ related curve in a case where $\gamma=30°$, and curve J is the $\alpha$-$\beta$ related curve in a case where $\gamma=45°$. $\gamma$ is the angle between the straight lines $l_1$ and $l_2$ in the condition shown in FIG. 9. Curve H is the $\alpha$-$\beta$ related curve in a case where $\gamma=0°$, namely, in the device of FIG. 6.

In the case of a device having the characteristic of curve J, the pivotal movement starting position of the lever 30 in direction B is the position whereat the angle $\beta$ is $J_1$, and the pivotal movement terminating position of the lever 30 is the position whereat the angle $\beta$ is $J_2$. When the lever 30 starts its pivotal movement in direction B, the crank 29 lies at a position whereat the angle $\alpha$ is $J_1'$, and when the lever 30 has completed its pivotal movement in direction B, the crank 29 lies at a position whereat the angle $\alpha$ is $J_2'$. In the case of a device having the characteristic of curve I, the pivotal movement starting position of the lever 30 is at $I_1$, the position of the crank 29 corresponding thereto is $I_1'$, the pivotal movement terminating position of the lever 30 is $I_2$, and the position of the crank 29 corresponding thereto is $I_2'$. Upon starting of the rotation of the crank 29, the angle $\beta$ is varied in accordance with the curve J or I, as already described with reference to FIG. 7.

In FIG. 10, curves J and I are distorted as compared with curve H. Thus, the greater the angle $\gamma$, the sharper the rising of the pivotal movement start of the lever 30 in direction B, and the deceleration and acceleration during the reversal of the direction of pivotal movement become gentle and the backward movement speed becomes higher. $\gamma$ may be suitably set in accordance with such factors as the copying speed, the original scanning length, etc.

Figure 11:
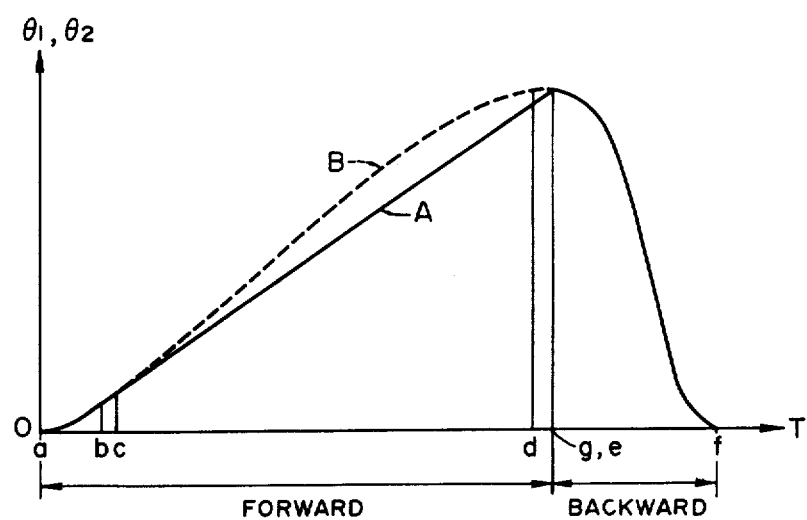
FIG. 11 illustrates the movement of a device employing the mechanism of FIG. 9.

FIG. 11 shows the relations between the angles $\theta_1, \theta_2$ and the time T in a case where the crank lever mechanism having the characteristic of curve J of FIG. 10 is applied to the device of FIG. 3. In FIG. 11, line A represents the angle of rotation $\theta_2$ of the shaft 39 and line B represents the angle of rotation $\theta_1$ of the gear 40.

In FIG. 11, point g, namely, the point of time whereat the gear 40 has reached the terminal point of the range of rotation in direction A, is coincident with point e, namely, the point of time whereat the overrunning clutch 43 has been disengaged and the shaft 39 has been released from the sprocket 44. Accordingly, in a device using the mechanism of FIG. 9, as compared with a device using the mechanism of FIG. 6, the reversal of the shaft 39 and thus the mirrors 4, 5 from the forward movement to the backward movement is smoother and has less shock. Also, in the device employing the mechanism of FIG. 9, the time between points a and b is shorter than that in the device employing the mechanism of FIG. 6 and therefore, point c can be brought closer to point a. In other words, the pre-running distances of the mirrors 4 and 5 can be further reduced.

In FIG. 3, reference numeral 45 designates a tension spring stretched between a pin 46 secured to the half-moon gear 49 and a pin 47 immovably secured within the copying machine body. The spring 45 is extended to charge its resilient force when the half-moon gear 49 pivots in direction B.

The drive force of the shaft 39 is provided by the rotational force of the crank 29. On the other hand, the forward rotation of the shaft 39 is relatively slow and the backward rotation thereof is rapid. When this difference in speed is exerted as a load fluctuation on the crank 29, it is transmitted to the motor 34 through the chain 36. The spring 45 prevents such load fluctuation so as not to impart an adverse effect to the rotation of the motor 34. That is, the spring 45 provides a load for the forward movement of the lever 30 in direction B (which is lower in speed than the backward movement), and releases its resilient force charged as previously described and acts as an auxiliary drive for the backward movement of the lever 30 in direction A. Thus, the load to the crank 29 is prevented from greatly fluctuating and is maintained substantially uniform over one reciprocation of the lever 30.

Figure 12:
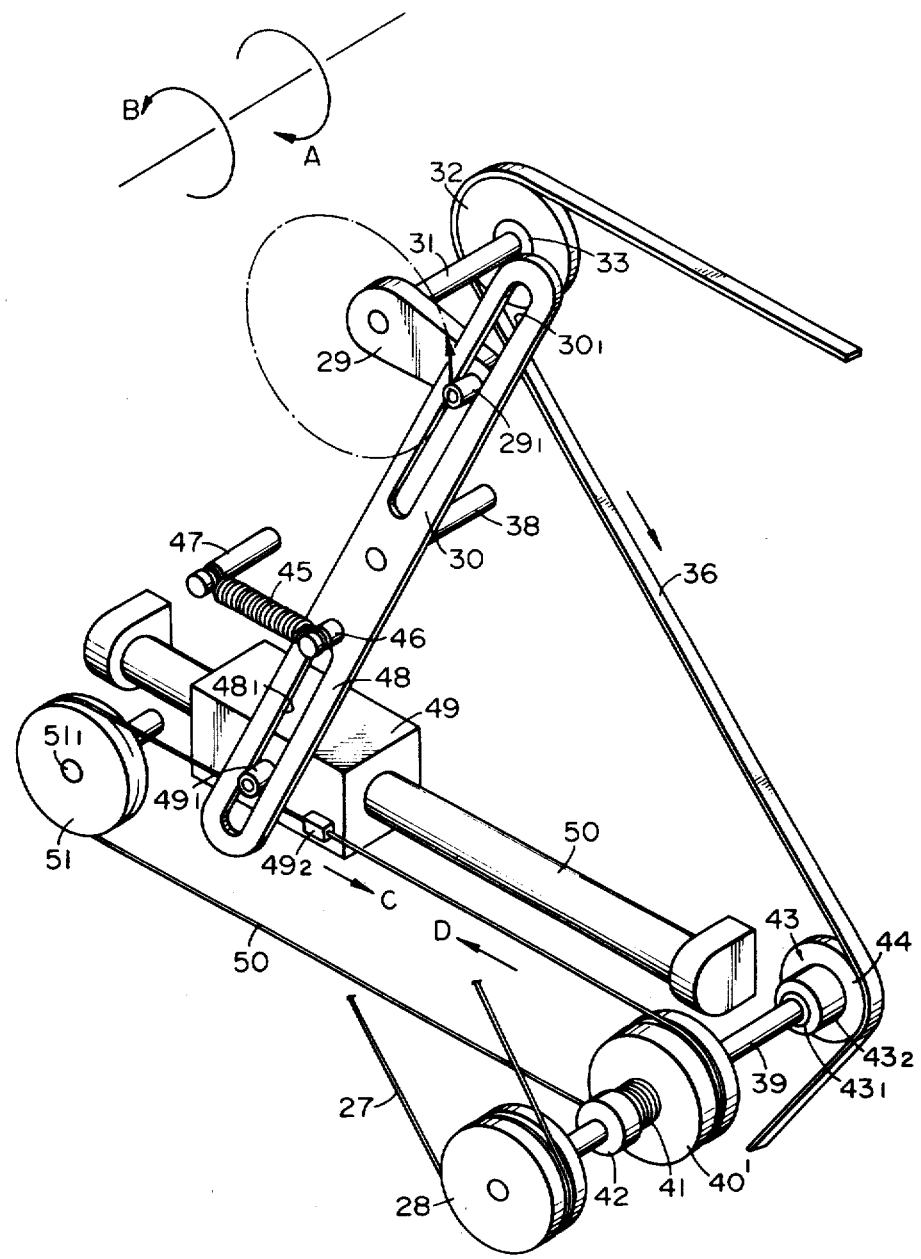
FIG. 12 illustrates another embodiment of the present invention.

In the embodiment of FIG. 3, the reciprocal pivotal movement of the lever 30 is converted into the reciprocal rotational movement of the shaft 49 by the half-moon gear 39 and gear 40. In the embodiment of FIG. 12, the movement of the lever 30 is transmitted to the shaft 39 by a mechanism different from the embodiment of FIG. 3.

In FIG. 12, means and members similar in construction and function to those in FIG. 3 are given reference characters similar to those in FIG. 3.

In FIG. 12, a lever 48 is formed integrally with the lever 29. The lever 48 is provided with a slot $48_1$. A roller $49_1$ is fitted in the slot $48_1$. The roller $49_1$ is attached to a slider 49. The slider 49 is supported on a straight guide rail 50 fixed in place within the copying machine body. Accordingly, the slider 49 is rectilinearly movable along the rail 50.

Designated by 40' is a pulley. This pulley 40' is similar in construction to the gear 40 described in connection with FIGS. 3 and 4, except that it has a wire winding surface instead of teeth on its peripheral surface. Like the gear 40, the pulley 40' is connected to the shaft 39 through a spring 41. Of course, the mechanical relations of the pulley 40' to the spring 41, the sleeve 42 and the shaft 39 are similar to those of the gear 40.

Now, an endless wire 50 is wound on the pulley 40' by several turns. The wire 50 is passed over a pulley 51 rotatably supported in place by a shaft $51_1$. The wire 50 between the pulleys 51 and 40' is fixed to the slider 49 by a fixing member $49_2$.

In FIG. 12, when the crank 29 starts in direction B, the lever 30 also starts in direction B as in the previously described embodiment. Thus, the lever 48 also starts to pivot in direction B. This pivotal movement of the lever 48 is transmitted to the slider 49 through the roller $49_1$ engaged in the slot $48_1$. Accordingly, by the pivotal movement of the lever 48 in direction B, the slider 49 is rectilinearly moved in direction C. When the lever 48 terminates its pivotal movement in direction B and reverses the direction of its pivotal movement to direction A, the slider 49 also reverses the direction of its movement to direction D. By said rectilinear reciprocal movement, the slider 49 reciprocally drives the wire 50. Accordingly, when the slider 49 moves forward in direction C, the pulley 40' is rotated in direction A, and when the slider 49 moves backward in direction D, the pulley 40' is rotated in direction B. The angular speed of the lever 30 varies as described in connection with FIG. 7. The angular speed of the lever 48 is the same as that of the lever 30.

Describing in greater detail, when the crank 29 starts to rotate in direction B from its shown position, the lever 30 starts to pivot in direction B and its speed increases. This pivotal movement is converted into the rectilinear movement of the slider 49 in direction C through the lever 48, and is transmitted to the pulley 40' through the wire 50 to rotate the pulley 40' in direction A. The rotational force of the pulley 40' is transmitted to the shaft 39 through the coil spring 41. Accordingly, the shaft 39 is also rotated in direction A. As the speed of the pivotal movement of the lever 30 in direction B increases, the rotational speed of the shaft 39 increases and exceeds the rotational speed of the sprocket 44 in direction A. Thereupon, the overrunning clutch 43 engages and the rotational speed of the shaft 39 becomes coincident with the rotational speed of the sprocket 44, and any further increase in rotational speed becomes impossible for the same reason as that set forth previously. When the rotational speed of the pulley 40' further increases, the pulley 40' is rotatively displaced in direction A on the shaft 39 while deforming the coil spring 41 so as to be tightened. When the crank 29 further continues to rotate, the rotational speed of the lever 30 in direction B begins to decrease and the rotational speed of the pulley 40' is also decreased and becomes slower than that of the sprocket 42, but the shaft 39 continues to rotate at a speed equal to that of the sprocket 44 as long as said resilient deformation of the coil spring 41 remains. When the lever 30 reaches the terminal end of its range of pivotal movement in direction B and is reversed to the pivotal movement in direction A, the slider 49 is also reversed to the movement in direction D and the direction of rotation of the pulley 40' and shaft 39 is also reversed from direction A to direction B. At this time, the overrunning clutch 43 has already been disengaged and the shaft 39 has already been released from the sprocket 44. The lever 30 smoothly accelerates in direction A and reaches its maximum speed, whereafter it returns to the pivotal movement starting point in direction B while smoothly decelerating. The speed changes during the rotation of the pulley 40' and shaft 39 in direction B correspond to the speed change during the pivotal movement of the lever 30 in direction A.

Figure 13:
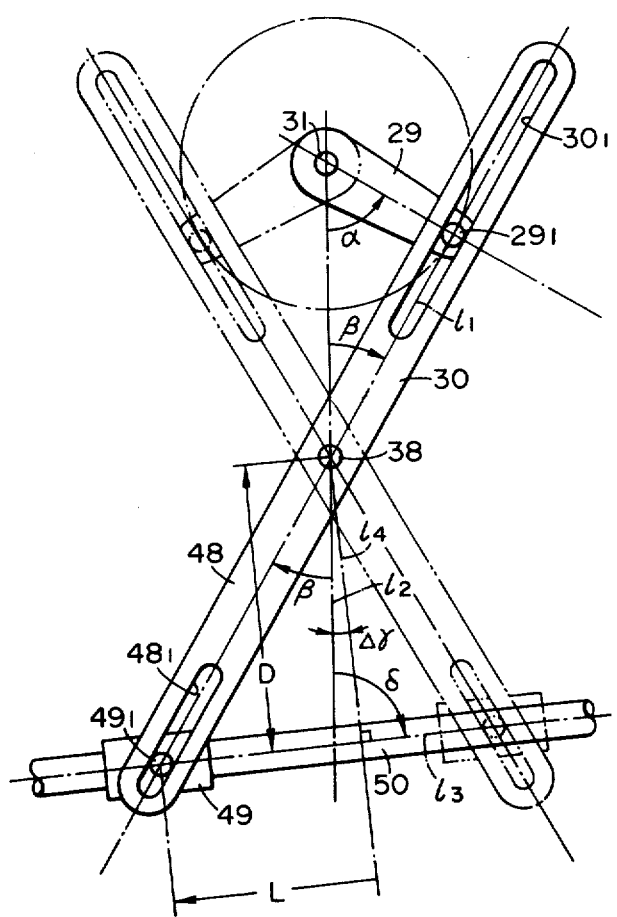
FIG. 13 illustrates a crank-lever-lever-slider mechanism.

FIG. 13 shows the crank lever slider mechanism of FIG. 12. In the example shown in FIG. 13, the center line $l_1$ of the slot $30_1$ of the lever 30 is coincident with the center line of the slot $48_1$ of the lever 48, and this center line $l_1$ passes through the pivot axis 38 of the levers 30 and 48. The center axis $l_3$ of the guide rail 50 of the slider 49 and the straight line $l_2$ form an angle $\delta$. In the case of FIG. 13, the straight line $l_2$ forms the bisecting line of the range of angle of the reciprocal pivotal movement of the arm 48. The relation between the angle $\alpha$ and the angle $\beta$ is the same as that described in connection with FIG. 7.

The position of the slider 49 relative to the angle $\beta$ will now be described. The angle of rotation of the pulley 40' after started corresponds to the position of this slider 49.

Let $l_4$ be the perpendicular from the axis 38 to the guide rail axis $l_3$. Let D be the distance between the axis 38 and the foot of the perpendicular $l_4$ (the distance of the axis 38 from the rail axis $l_3$). Let L be the distance between the foot of the perpendicular $l_4$ and the roller $49_1$. Let $\Delta\gamma$ be the angle between the straight line $l_2$ and the perpendicular $l_4$.

In the foregoing, L is obtained by $L = D \times \tan(\beta + \Delta\gamma)$. Since $\beta$ is the function of time, L is also the function of time. Accordingly, if L is differentiated by time, the speed of the slider 49 will be obtained. The angular speed of the pulley 40' directly corresponds to the speed of the slider 49. In other words, the angular speed of the pulley 40' varies in proportion to the speed change of the slider 49.

Figure 14:
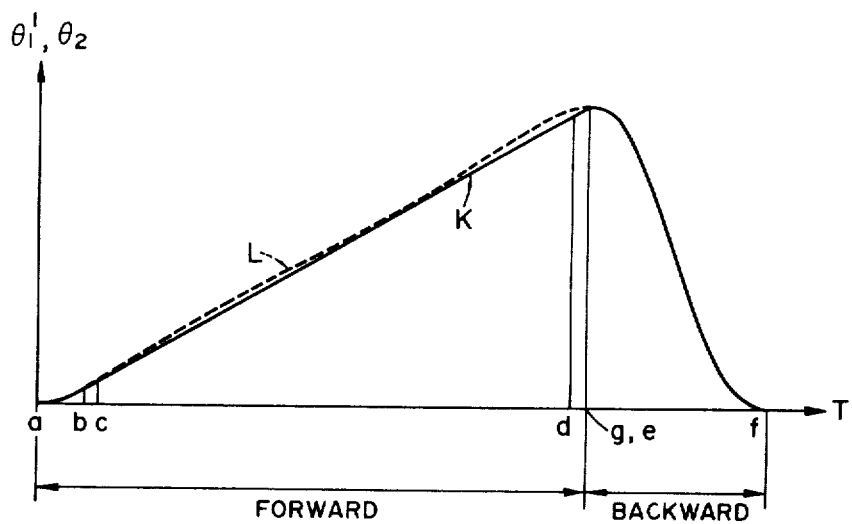
FIG. 14 illustrates the movement of an example of the FIG. 12 device.

FIG. 14 shows the angle of rotation $\theta_1'$ of the pulley 40' and the angle of rotation $\theta_2$ of the shaft 39 where $\Delta\gamma$ is 0°, namely, where the rail axis $l_3$ is made to be orthogonal to the straight line $l_2$. In FIG. 14, L is the angle of rotation of the pulley 40', and K is the angle of rotation of the shaft 39. The meanings of points a, b, c, d, e, f and g are the same as those previously described. As seen in FIG. 14, in this device, the point of time g whereat the pulley 40' is reversed from its forward rotation to its backward rotation is coincident with the point of time e whereat the overrunning clutch 43 is disengaged. Accordingly, at point g (i.e. point e), the shaft 39 is smoothly reversed from its rotation in direction A to its rotation in direction B. Also, as seen in FIG. 14, the shaft 39 is smoothly reversed from its rotation in direction B to its rotation in direction A.

Figure 15:
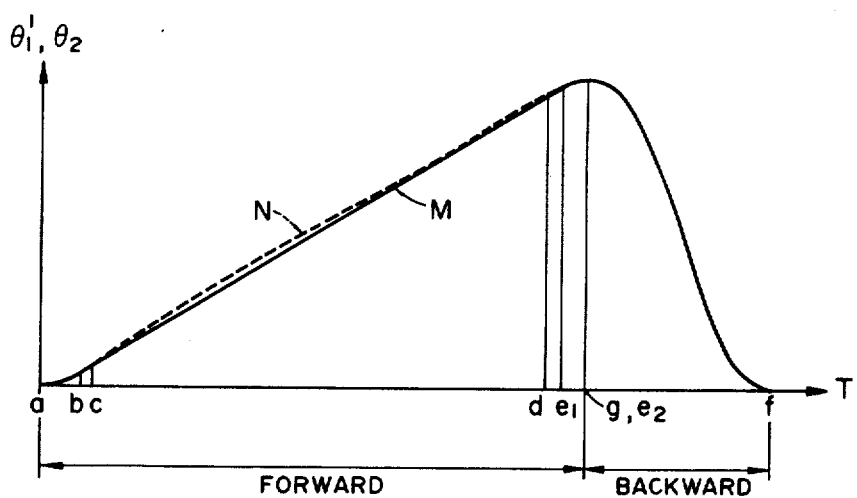
FIG. 15 illustrates the movement of another example of the FIG. 12 device.

FIG. 15 shows the relations between $\theta_1'$, $\theta_2$ and T where $\Delta\gamma$ is not 0 in FIG. 13, in other words, in a device wherein the guide rail 50 is somewhat inclined with respect to the direction perpendicular to the straight line passing through the axes 31 and 38. N is the angle of rotation of the pulley 40', and M is the angle of rotation of the shaft 39. In FIG. 15, the meanings of points a, b, c, d, g and f are the same as those previously described. Point $e_1$ is the point of time whereat the overrunning clutch 43 is disengaged and the shaft 39 is released from the sprocket 44. Point $e_2$ is the point of time whereat the shaft 39 reaches the terminal point of rotation in direction A, in other words, the point of time whereat the direction of rotation is reversed from direction A to direction B. This point $e_2$ is coincident with point g, namely, the point of time whereat the direction of rotation of the pulley 40' is reversed. Thus, in this embodiment, point $e_1$ can be displaced earlier than point g (point $e_2$) and therefore, the reversal of the mirrors 4 and 5 from their forward movement to their backward movement can be effected most smoothly. Of course, the acceleration during the start of the forward movement of the mirrors 4 and 5 is also smooth, and the reversal thereof from their backward movement to their forward movement is also smooth.

In the embodiment described in connection with FIGS. 12 and 13, the rising of speed of the mirrors 4, 5 during the start of forward movement is rapid and therefore, the pre-running distances of the mirrors 4, 5 can be further reduced. Also, as seen in FIGS. 14 and 15, the difference between the angle of rotation of the shaft 39 indicated by solid line between points b and e or between points b and $e_1$ and the angle of rotation of the pulley 40' indicated by broken line is small. In other words, the difference in speed when the angular speed of rotation of the pulley 40' in direction A exceeds the angular speed of rotation of the sprocket 44 is small. Accordingly, the amount of relative angular displacement of the pulley 40' to the shaft 39 at this time is also small and therefore, no unreasonable load is exerted on the spring 41.

Figure 16:
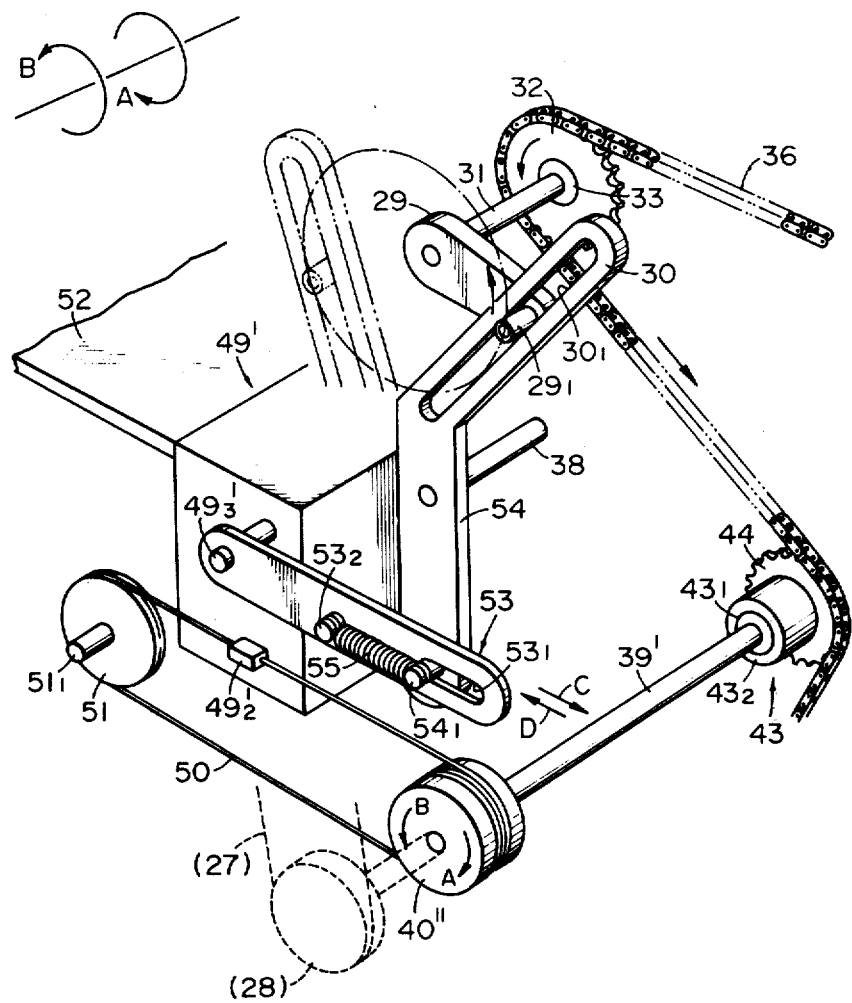
FIG. 16 illustrates still another embodiment of the present invention.

In the above-described embodiments, the speed of the output shaft 39 for imparting a drive force to the mirrors 4 and 5 which are driven members has been controlled by the brake action of the speed control means having the overrunning clutch 43, sprocket 44, chain 36 and motor 34 so as not to exceed a predetermined speed during the rotation thereof in direction A. In the following embodiment, the action of the speed control means is imparted directly to the driven members. In FIG. 16, means and members similar in construction and function to those in the above-described embodiments are given similar reference characters. Designated by 49' is a slider rectilinearly reciprocable in the directions of arrows C and D. The slider 49' is guided by the rail 45 as shown in FIG. 12. Fixed to this slider 49' is an original carriage 52 of the copying machine for reciprocally moving the original supporting table and scanning an original during the forward movement thereof. A pin $49_3{}'$ is secured to the slider 49', and a link plate 53 is pivotally connected to the pin $49_3{}'$. The link plate 53 is provided with a slot $53_1$, in which is fitted a pin $54_1$ secured to the lower arm 54 of the lever 30. On the other hand, a pin $53_2$ is secured to the link plate 53. A spring 55 extends between the pin $53_2$ and the pin $54_1$. The spring 55 biases the arm 54 in direction A. An endless wire 50 is secured to the slider 49' by a securing member $49_2{}'$. The wire 50 is passed over a pulley 51 and is wound on a pulley 40'' by several turns, the pulley 40'' being fixed to a shaft 39'. The shaft 39', like the shaft 39, is connected to sprocket 44 through the overrunning clutch 43.

During the starting of the apparatus, the pin $54_1$ is caused to bear against the end of the slot $53_1$ of the link plate with respect to the direction of backward movement by the resilient force of the spring 55. When the crank 29 is started in direction B from this condition, the pivotable lever 30 starts to pivot in the same direction through the roller $29_1$ of the crank and the speed of the pivotal movement thereof gradually increases. Accordingly, by the pivotal movement of the arm 54, the link plate 53 is moved in the direction of arrow C through the pin $54_1$ and spring 55 to forwardly move the slider 49' (and thus the original carriage 52) in the same direction. By the forward movement of the slider 49', the wire 50 is moved round in the direction of arrow C to rotate the pulley 40'' in direction A. When the speed of the pivtal movement of the pivotable arm 54 increases and the rotational angular speed of the pulley 40'' exceeds the rotational angular speed of the sprocket 44, the overrunning clutch 43 is connected and therefore, the rotational angular speed of the pulley 40'' is controlled so as to be equal to that of the sprocket 44, for the same reason as that set forth previously. Consequently, the speed of the forward movement of the slider 49'' is maintained constant. When the speed of the pivotal movement of the pivotable arm 54 further increases, the spring 55 is pulled and stretched by the arm 54 because the speed of the forward movement of the slider 49' is controlled to a constant speed, whereby absorbing the increase in speed of the pivotal movement of the pivotable arm 54. At this time, the pin $54_1$ is displaced in the slot $53_1$ in direction C relative to the link plate 53. Thereafter, the speed of the pivotal movement of the pivotable arm 54 begins to decrease, but the slider 49' continues to move forward at a constant speed by the brake action of the speed control means as long as the spring 55 is stretched.

When the pivotable lever 30 reaches the terminal end of its pivotal movement in the direction B indicated by dot-and-dash line and starts to pivot in direction A, the pin $54_1$ of the pivotable arm 54 is caused to bear against the end of the slot $53_1$ with respect to direction D by the tension force of the spring 55, thereby pushing the link plate 53 in the direction of arrow D. Consequently, the slider 49' and accordingly the original carriage 52 start to move backward in the same direction. During this backward movement, the pulley 40'' is rotated in direction B through the wire 50, so that the overrunning clutch 54 is disconnected. Consequently, the fixed shaft 39' of the pulley 40'' becomes free to rotate relative to the sprocket 44, and the slider 49' and the original carriage 52 terminate their backward movement at a speed higher than that during the forward movement by the quick return function of the pivotable lever 30.

When the lever as shown in FIG. 6 is used as the lever 30, the distance of the slider 49' from the forward movement starting point with respect to time T becomes such as indicated by a solid line in FIG. 8. When the lever as shown in FIG. 9 is used as the lever 30, said distance becomes such as indicated by a solid line in FIG. 11. At this time, in FIGS. 8 and 11, the vertical axis represents distance instead of angle. Thus, in the device of FIG. 16, the speed control means having the wire 50, pulleys 51, 40''', shaft 39', overrunning clutch 43, pulley 44, chain 36 and motor 34 directly controls the speed of the forward movement of the rectilinearly reciprocable slider 49' (to which the original carriage 52 is fixed).

In FIG. 16, it is also possible to not use the original carriage 52 and instead, fix the output pulley 28 to the shaft 39' and transmit the output of this pulley 28 to the scanning means driving pulley 13 through wire 27. In this case, members 55, 53, 49', 50, 51 and 40'' together constitute drive force transmitting means, and the speed control means is constituted by the overrunning clutch 43, sprocket 44, chain 36 and motor 34.

Figure 17:
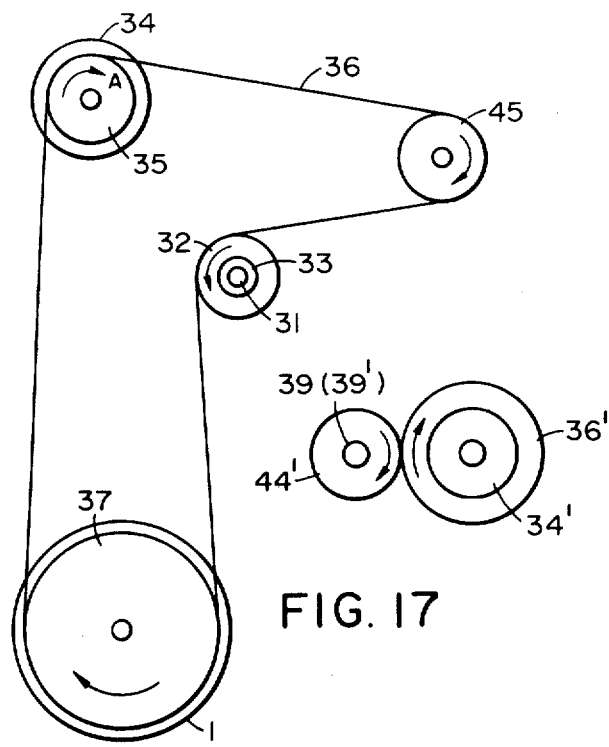
FIG. 17 illustrates another example of the drive force transmitting path in the copying machine.

In the above-described embodiment, the sprocket 44 and crank 29 are driven by a common motor 34 through the chain 36, but alternatively they may be driven by different motors. In FIG. 17, the sprocket 44 in each of the described embodiments is replaced by a gear 44', and a gear 36' fixed to the output shaft of a motor 34' different from the motor 34 is in mesh engagement with the gear 44'. Thus, the gear 44' is rotatively driven by the motor 34' in direction A at a predetermined speed corresponding to the original scanning speed.

Also, instead of the speed control means constituted by the overrunning clutch 43, etc., the shaft 39 or 39' may be connected to a governor so that the speed of the shaft 39 or 39' may be controlled by the governor.

In the above-described embodiment, the lever 30 is integral with the half-moon gear 49 or the lever 48 or the arm 54. However, the lever 30 may be made separate from the latter and the two may be mechanically connected together.

Further, in the above-described embodiment, the pulley 14, the wire 27 and the pulley 28 may not be used and the scanning means driving pulley 13 may be directly fixed to the shaft 39 or 39'.

Also, in the above-described embodiment, the crank 29 and lever 30 have been used to convert the one-way rotational movement of the shaft 31 into reciprocal movement. However, the crank 29 may be replaced by a cam 29' and the lever 30 may be replaced by a lever 30' resiliently urged against the cam 29' by a spring 45'. The cam surface of the cam 29' against which the lever 30' bears may be configured such that one full rotation of the cam causes one reciprocal pivotal movement of the lever 30', that the speed of the backward movement of the lever 30' is higher than the speed of the forward movement thereof and that the reversal of the lever from its forward movement to its backward movement or from its backward movement to its forward movement is smooth. That is, the shape of the cam 29' is formed such that for one full rotation of the cam, the lever 30' exhibits the variation in angle of rotation as shown, for example, in FIGS. 7 and 10. The cam 29' is fixed to the shaft 31, and the lever 30' is pivotally supported on the shaft 38. The half-moon gear 39 or the lever 48 or the arm 54 is coupled to the lever 30'.

Figure 18:
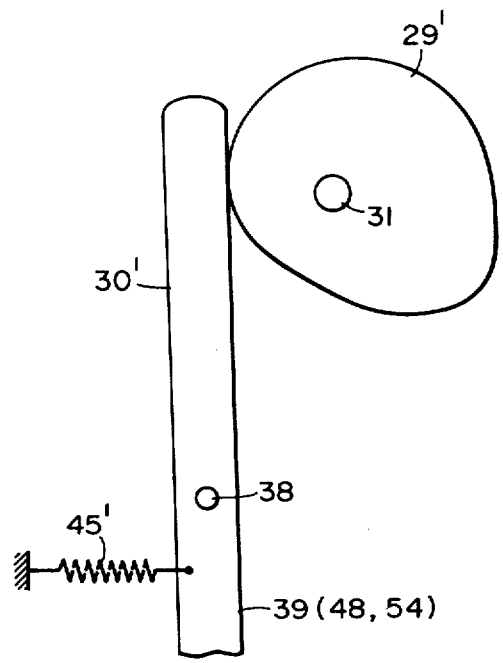
FIG. 18 illustrates a cam-lever mechanism.

According to the present invention, even if the cam-lever mechanism as shown in FIG. 18 is used, the speed of the original scanning means during the original scanning is controlled by the speed control means and therefore, high accuracy is not required in machining of the cam surface.

Further, in the embodiments described with reference to FIGS. 3 and 12, when the movable member on that side which transmits the drive force moves at a speed exceeding the speed of the movable member on that side to which the drive force is transmitted, the resilient member (spring 41) for displacing the former relative to the latter while maintaining the mechanical coupled relation between the two, namely, for absorbing the speed difference between the two, may be provided between the shaft 31 and the crank 29 instead of between the shaft 39 and the gear 40 or the pulley 40'. That is, generally speaking, the speed difference absorbing resilient member (springs 41, 55) as described above may be installed in the drive force transmitting path in which the speed control means is connected so that the drive force is transmitted to the movable member (shaft 39, slider 49$_3$') whose speed of forward movement is controlled by said means.

While the device for reciprocally driving the original scanning means (movable mirrors or movable original carriage) of a copying machine has been described with respect to the embodiments thereof, the present invention is not restricted thereto but is generally applicable to the devices for reciprocally driving movable members.

What I claim is:

1. A mechanism for reciprocally driving a movable member, said mechanism comprising:
    a constant speed drive source movable in a predetermined direction;
    movement converting means for converting the movement of said drive source into a reciprocal movement in which the time required for backward movement is shorter than the time required for forward movement;
    output means connected to said movement converting means to put out a reciprocal movement for driving the movable member; and
    speed control means for controlling the speed of the forward movement of said movable member so as not to exceed a predetermined speed, said speed control means comprising overrunning clutch means interposed between said constant speed drive source effecting a constant speed movement and said output means.

2. A mechanism according to claim 1, wherein said movement converting means comprises crank means connected to said drive source, and lever means having a crank guide portion engaged with said crank means and pivotable about an axis.

3. A mechanism according to claim 1, further comprising resilient coupling means interposed in at least one place in the drive transmitting path leading from said drive source to said movable member.

4. A mechanism according to claim 2, wherein a major portion of said crank guide portion of said lever means engaged with said crank means is rectilinear, and wherein the extension of said rectilinear portion of said crank guide portion and said axis are spaced apart by a predetermined distance.

5. A mechanism for reciprocally driving a movable member, said mechanism comprising:
    a constant speed drive source movable in a predetermined direction;
    movement converting means for converting the movement of said drive source into a reciprocal movement in which the time rquired for backward movement is shorter than the time required for forward movement;
    output means connected to said movement converting means to put out a reciprocal movement for driving the movable member; and
    speed control means for controlling the speed of the forward movement of said output means so as not to exceed a predetermined speed, said speed control means comprising overrunning clutch means interposed between said constant speed drive source effecting a constant speed movement and said output means.

6. A mechanism according to claim 5, wherein said movement converting means comprises crank means connected to said drive source, and lever means having a crank guide portion engaged with said crank means and pivotable about an axis.

7. A mechanism according to claim 5, further comprising resilient coupling means interposed in at least one place in the drive transmitting path leading from said drive source to said output means.

8. A mechanism according to claim 6, wherein a major portion of the crank guide portion of said lever means engaged with said crank means is rectilinear, and wherein the extension of said rectilinear portion of said crank guide portion and said axis are spaced apart by a predetermined distance.

9. A reciprocally driving device comprising:
a constant speed drive source normally movable in a predetermined direction;
a reciprocal movement converting mechanism connected to said drive source and converting the movement thereof in said predetermined direction into a reciprocal movement in which the time required for backward movement is shorter than the time required for forward movement;
a driven member connected to said reciprocal movement converting mechanism; and
a control mechanism connected to said driven member to control the speed of the forward movement thereof so as not to exceed a predetermined speed, said control mechanism comprising an overrunning clutch interposed between said constant speed drive source and said driven member.

10. A reciprocally driven device according to claim 9, further comprising resilient coupling means interposed in at least one place in the drive force transmitting path leading from said drive source to said driven member.

11. A reciprocally driving device comprising:
a constant speed drive source normally movable in a predetermined direction;
crank means connected to said drive source and normally rotatable in a predetermined direction;
first lever means engaged with said crank means and effecting a quick return reciprocal pivotal movement;
second lever means connected to said first lever means and effecting a pivotal movement;
straight guide means;
slider means guided by said straight guide means and engaged with said second lever means to effect a reciprocal movement;
output means connected to said slider means and connected to a driven member; and
control means for controlling the speed of the forward movement of said output means so as not to exceed a predetermined speed, said control means comprising overrunning clutch means interposed between said constant speed drive source effecting a constant speed movement and said output means.

12. A reciprocally driving device according to claim 11, further comprising resilient coupling means interposed in at least one place in the drive force transmitting path leading from said drive source to said output means.

13. A reciprocally driving device according to claim 11, wherein a line bisecting the extremes of pivoted movement of said second lever means and the guide direction of said straight guide means do not perpendicularly intersect each other.

* * * * *